J. LEDWINKA.
ASSEMBLING MACHINE.
APPLICATION FILED MAY 6, 1915.
1,216,467.
Patented Feb. 20, 1917.
3 SHEETS—SHEET 1.
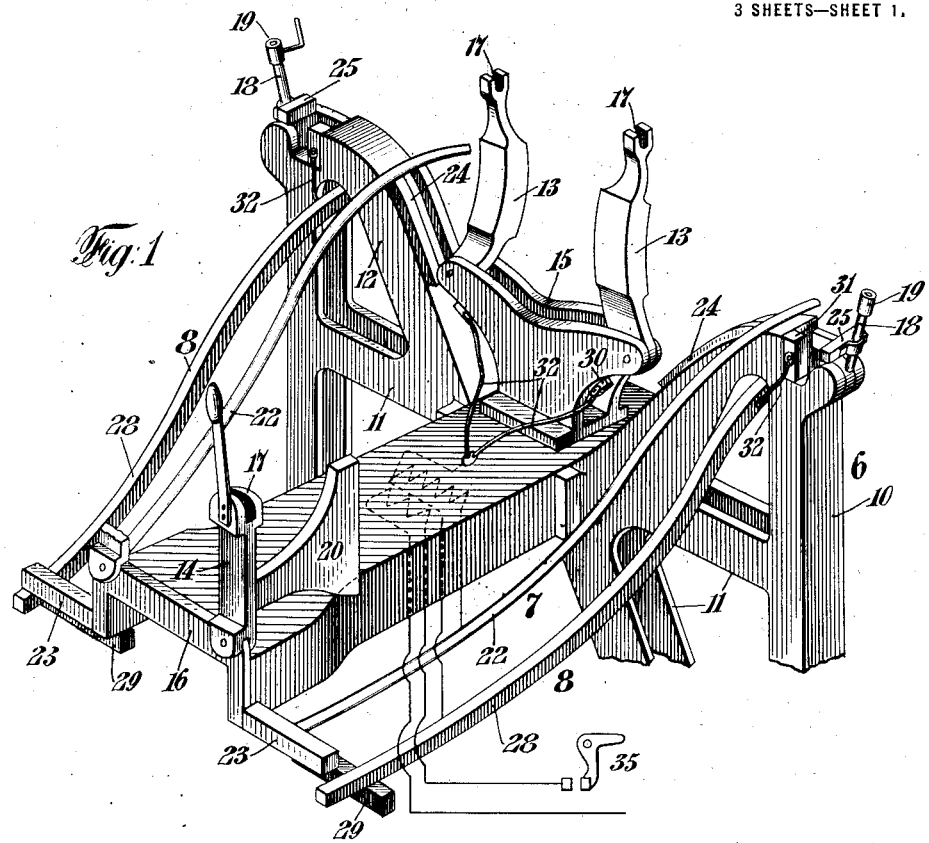
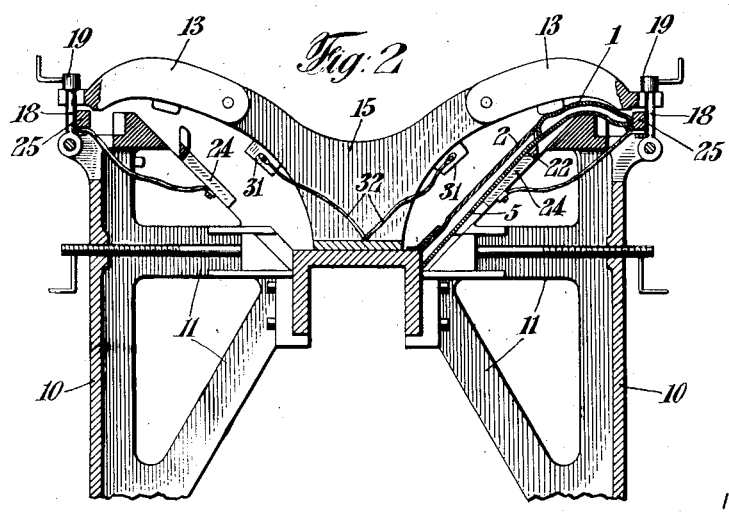
INVENTOR
Joseph Ledwinka
BY
Edwin B. H. Tower Jr. ATTORNEY

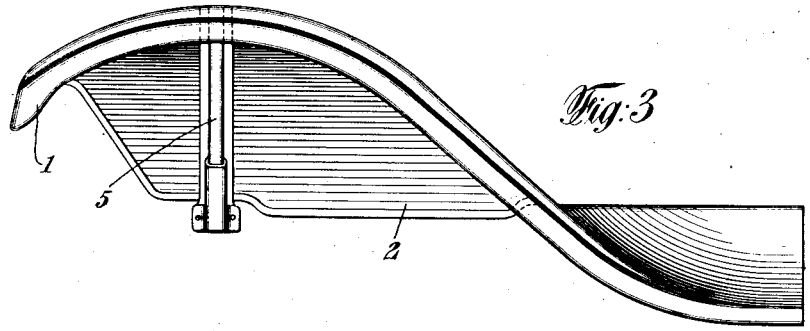
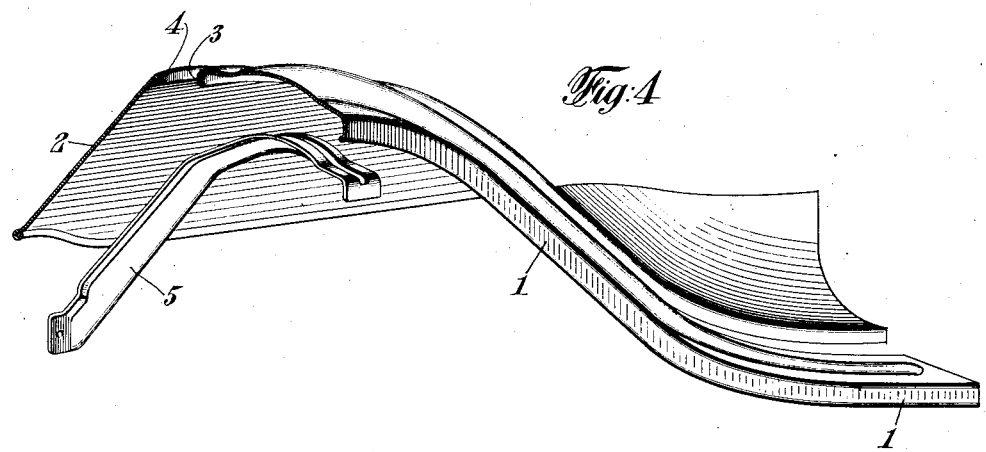
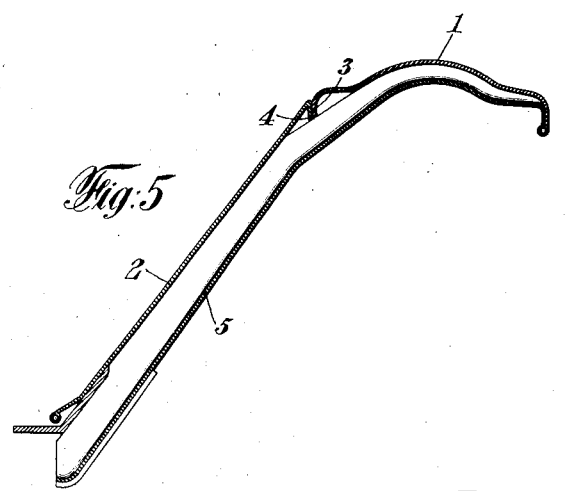

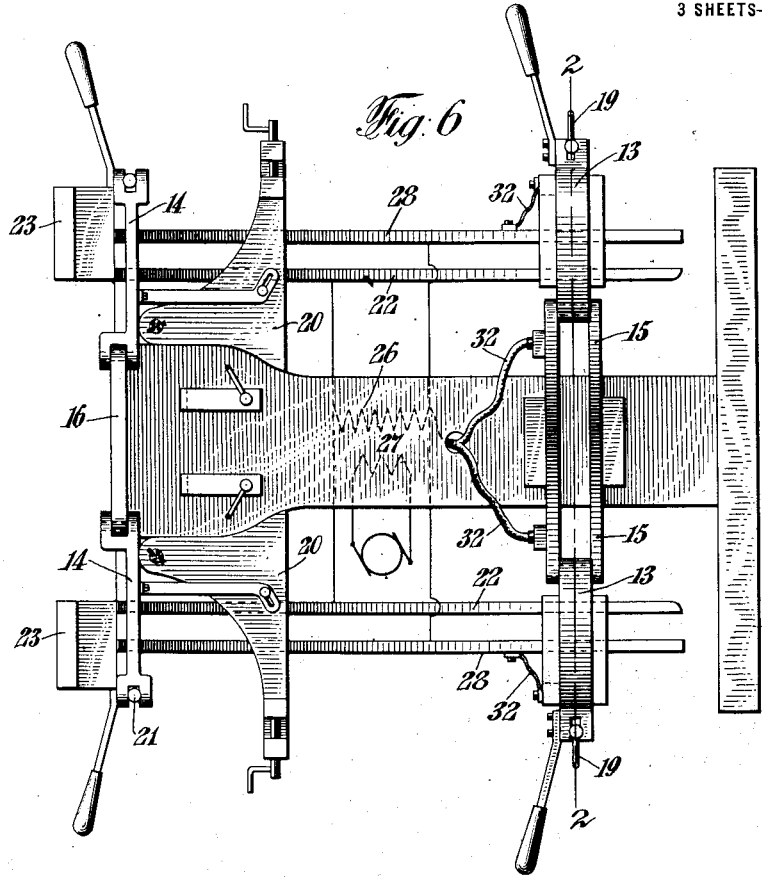
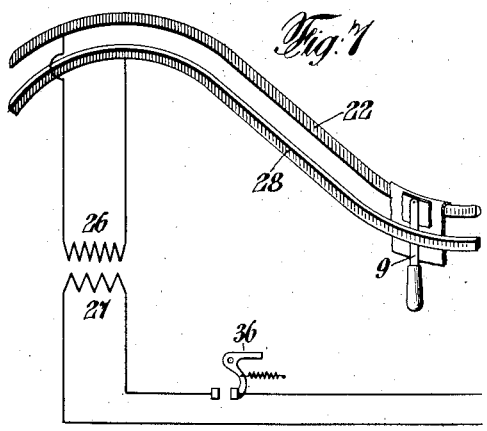
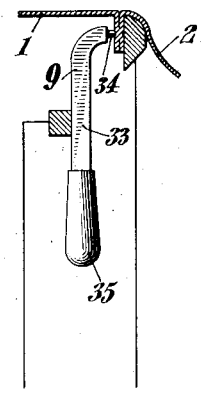

UNITED STATES PATENT OFFICE.

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ASSEMBLING-MACHINE.

1,216,467.  Specification of Letters Patent.  Patented Feb. 20, 1917.

Application filed May 6, 1915. Serial No. 26,225.

*To all whom it may concern:*

Be it known that I, JOSEPH LEDWINKA, a citizen of the United States, residing at Philadelphia, in the county of Philadelphia and State of Pennsylvania, have invented new and useful Improvements in Assembling-Machines, of which the following is a specification.

This invention relates to assembling machines.

It is particularly applicable to machines for assembling metal vehicle fenders, such as automobile fenders.

Automobile fenders comprise in general two parts, a crown and a skirt. These are preferably stamped or pressed out of sheet metal and united to form a fender. Fenders are usually of such size and shape that they must be supported in stationary position while being assembled. The problem has been to accurately and expeditiously assemble and unite the fender parts.

One of the objects of the present invention is to provide an improved machine by means of which vehicle fenders may be quickly and accurately assembled.

Another object is to provide a machine in which the fender parts are supported in stationary assembled relation while being joined together.

Another object is to provide a machine for accurately and expeditiously assembling and welding vehicle fenders.

A further object is to provide a machine in which a vehicle fender may be assembled and its parts welded together at various points at the same time.

A further object is to provide a welding machine in which a plurality of metal members may be supported in stationary assembled position and be welded together at various points without moving the electrodes.

Other objects and advantages of the invention will hereinafter appear.

While the embodiment of the invention shown herein is particularly adapted to assemble and weld automobile fenders, it should be understood that the invention may be applied to machines for assembling metal structures of various other shapes.

The accompanying drawings illustrate an embodiment of the invention.

The figures of said drawings are as follows:

Figure 1 is a perspective view of the main portion of the assembling machine.

Fig. 2 is a cross-section on the line 2—2 of Fig. 6.

Fig. 3 is an elevation of an assembled vehicle fender.

Fig. 4 is a perspective view showing the fender parts in separated relation.

Fig. 5 is a cross-sectional view of the assembled fender taken through the supporting arm.

Fig. 6 is a plan view of the machine.

Figs. 7 and 8 are views showing the manner in which the welding circuit is completed.

The vehicle fender to which the present machine is adapted is shown in Figs. 3, 4 and 5. It has a crown 1 and a skirt 2 each of which is formed out of sheet metal and provided with an inturned flange. The flanges, which are numbered 3 and 4 respectively, are adapted to abut each other and be joined together to unite the fender parts. An arm 5 is provided for supporting the fender from a vehicle frame. The fender parts are preferably united by electric welding. The inturned flanges 3 and 4 of the crown and skirt are welded together and the arm 5 is welded to the skirt and the crown at various points. It should be understood that the shape of the fender parts and the points at which they are welded together may be varied as desired.

The assembling machine comprises in general a frame 6, stationary electrodes 7 and 8, and a connector 9 for completing a circuit between the electrodes through the fender parts to weld said parts together.

The frame 6 comprises a plurality of standards 10 and cross members 11 suitably joined together to form the body of the machine. The frame supports the electrodes 7 and 8 and it is shaped to receive and support the fender skirt 2 with the inturned flange 4 thereof hooked over a portion of electrode 7 as shown in detail in Fig. 8. The frame is further adapted to receive and support the crown in accurate assembled relation to the skirt with the inturned flange 3 of the crown in contact with the flange 4 of the skirt. The forward end of the frame has an inclined portion 12 shaped to receive the fender arm 5 and support it in proper relation to the crown and skirt. Of course, the shape of the frame may be varied to suit different fender designs and to adapt the machine to structures of other shapes.

In order to hold the fender parts in position in the machine suitable clamps 13 and 14 are provided which are pivoted to bearing members 15 and 16 on the frame.

Clamp 13 is pivoted to the member 15 near the forward end of the machine opposite the inclined portion 12 of the frame. It is adapted to engage the forward end of the fender and hold the fender support 5 in proper relation thereto. The clamp 13 has a bifurcated end 17 coöperating with a pivoted arm 18 carrying a nut 19 adapted to be screwed down against the clamp to hold it in position.

The clamp 14 is pivoted to the bearing member 16 at the rear of the machine and is adapted to engage the rear end of the fender. It is provided with an extension 20 conforming to the contour of the fender for extending the bearing surface of the clamp. The bifurcated end 17 of clamp 14 coöperates with a clamp 21 by means of which it is forced to and held in proper position.

It will thus be seen that means is provided for receiving, supporting and holding the fender parts in accurate stationary assembled position.

The electrode 7 is preferably made up of a plurality of bars of copper or other good conducting material of sufficient size to carry a heavy current of low voltage such as is used in resistance welding. The main part of the electrode comprises a curved bar 22 shaped to receive the fender skirt and to contact the inturned flange thereof, (see Fig. 6). This bar aids in supporting the skirt and forms a rigid contact with which the flange may be brought into engagement when pressure is exerted thereon during the welding operation.

The main bar 22 of electrode 7 is electrically connected at its lower end to a bar 23 extending at right angles therefrom. It is connected at its upper end to copper blocks 24 and 25 which are located so as to contact the fender at the points where the arm 5 is welded thereto. The location of the extension 23 and of the blocks 24 and 25 may be varied to suit the requirements of the structure which is to be welded. The bar 22 is connected on one side of the secondary 26 of a transformer 27 located at any convenient point on or adjacent to the machine. The conducting members 22, 23, 24 and 25 constitute in effect a single stationary electrode which for convenience will be called negative. It should be understood that these members may be electrically separate from one another if required. Each may be connected to the same side of the electric circuit to form a plurality of stationary electrodes of the same polarity.

The electrode 8 comprises a plurality of copper bars similar to those of electrode 7. It has a main bar 28 curved to correspond to the bar 22 and located adjacent and substantially parallel thereto. The bar 28 is connected to the side of the secondary 26 of the transformer opposite to that connected to bar 22. The bar 28 is also electrically connected to a bar 29 located adjacent and parallel to the bar 23. Contact blocks 30 and 31 are provided which are positioned adjacent the corresponding blocks 23 and 24 of electrode 7. These blocks are connected by means of conductors 32 to the side of the transformer connected to bar 28. The conducting members 28, 29, 30 and 31 constitute a positive electrode. They may all be electrically connected together or they may be electrically separate and each connected to the same side of the electric circuit.

It will thus be seen that a negative electrode comprising the bar 22, extension 23 and blocks 24 and 25 is provided which is adapted to contact the fender parts along the joints to be welded and a positive electrode comprising the bar 28, extension 29 and blocks 30 and 31 is located adjacent the negative electrode in such relation thereto that a circuit may be completed from one electrode to the other at any convenient point. The means for completing this circuit is the connector 9 which will now be described.

The connector comprises a shank 33 of conducting material having a cold drawn copper welding tip 34 removably secured in one of its ends at right angles to its axis. (See Fig. 8.) The opposite end of the shank is provided with a suitable handle 35. The shank is of sufficient length to bridge the space between the stationary electrodes 7 and 8. Of course the connector may assume various other forms.

The connector is not only adapted to complete the circuit between the electrodes but it may also be used for exerting pressure on the joint to be welded. The electrodes are located adjacent each other so that the connector can be used as a lever with one of the electrodes acting as a fulcrum. Accordingly, a high pressure may be easily exerted at the same time the circuit is completed. This is illustrated in Fig. 8 which shows the connector in circuit closing position.

This structure has many advantages. The voltage used for resistance welding is usually quite low. In order that the resistance of the circuit be low enough to allow a large welding current to flow it is desirable that pressure be brought to bear upon the joint to be welded at the time circuit is completed. This may be quickly and efficiently accomplished by a single movement of the connector 9 in the construction herein disclosed. In one movement the connector completes the circuit, exerts pressure on the joint, brings the joint into good electrical contact with the electrode 7 and is itself forced into good electrical contact with electrode 8.

A switch 36 is located in the primary circuit of transformer 27. This switch is of any suitable type, preferably a foot operated switch, and it is located at any convenient point or adjacent to the machine. It is normally biased to open position so that the electrodes are normally deënergized.

The operation of the machine is as follows:

The arm 5, skirt 2 and crown 1 are placed in the machine and the clamps 13 and 14 are adjusted to hold the parts accurately in their assembled position. With the parts in this position, the electrode 7 is in electrical contact with one side of the joints between the fender parts. The electrode 8 is adjacent the other side of the joints.

The welding is quickly accomplished by completing the circuit from one electrode to the other through the fender parts by means of the connector 9. The manner in which the circuit is completed is shown in Figs. 7 and 8. The connector is placed in contact with electrode 8 and, with this electrode acting as a fulcrum, and the connector as a lever, the welding tip 34 is pressed into engagement with the fender joint thereby completing a circuit from the electrode 8 through the shank 33, the welding tip 34 and the fender parts to the electrode 7. The operator closes the switch 36 simultaneously with the application of pressure on the connector.

When the circuit is completed a heavy current flows through the spot where the tip 34 contacts the fender parts. The resistance at this point causes heat to be developed which brings the parts to a welding temperature. The parts are forced together by the pressure of the connector and quickly united. This operation is completed at a plurality of points along the various joints. By using a plurality of connectors several operators may work at the same time and thereby increase the speed of assembly.

The fender is thus quickly and efficiently welded together while held in assembled position. The fender need not be moved for each weld and furthermore, it is not necessary to move the electrodes. The operator merely grasps the connector and completes the circuit at any point where a weld is desired. A plurality of welding operations may be carried on at the same time with a consequent saving in time and labor. Good electrical contact is insured at the joints since the electrode in contact therewith is rigid and the connector is applied with pressure. The parts are held accurately in assembled position and effectively welded so that a uniform, well-united product is produced.

While an embodiment of the invention has been shown and described, it should be understood that the structure shown is for purposes of illustration only, and that many other structures may be devised which embody the invention and which come within the spirit and scope of the appended claims.

What I claim as new and desire to secure by Letters Patent of the United States is:

1. A machine for assembling metal articles, comprising means to receive the members constituting the article and position and support them in assembled relation, a relatively stationary electrode adapted to contact the members along the joints to be welded, a second relatively stationary electrode supported along said joints but spaced away therefrom, and means for completing a circuit between said electrodes through said members at any point along the joints between the same, whereby said members may be readily welded together while supported in assembled position.

2. A machine for assembling metal articles, comprising means to receive the members constituting the article and position and support them in assembled relation, a relatively stationary electrode adapted to contact the members along the joints to be welded, a second relatively stationary electrode supported along said joints but spaced away therefrom, and means for completing circuits between said electrodes and through said members at a plurality of points along the joints between the same at the same time whereby the members may be readily welded together while supported in assembled relation.

3. A machine for assembling metal articles, comprising means to receive the members constituting the article and position and support them in assembled relation, an electrode adapted to contact the members along the joints to be welded, a second electrode supported along said joints but spaced away therefrom, and a plurality of independent connectors each adapted to complete a circuit between said electrodes and through said members at any point along the joints between said members, whereby said members may be welded together at any two or more different points at the same time.

4. A machine for assembling metal articles, comprising means to receive the members constituting the article and position and support them in assembled relation, a relatively stationary electrode adapted to contact one side of the joints between said members, a second relatively stationary electrode along the opposite side of said joints and spaced away therefrom, and movable means for completing the circuit between said electrodes and through said members at any point along the joints between said members to weld the members together.

5. A machine for assembling metal articles, comprising means to receive the members constituting the article and position and support them in assembled relation, a relatively stationary electrode adapted to contact one side of the joints between said members, a second relatively stationary electrode along the opposite side of said joints and spaced away therefrom in substantially parallel relation to the first electrode, and a plurality of connectors by which circuits may be completed between said electrodes through said members at any two or more points along said joints at the same time.

6. A machine for assembling metal articles, comprising means to position and support the members constituting the article in assembled relation, a relatively stationary electrode adapted to contact the joints between said members, a second relatively stationary electrode adjacent the first but out of contact with said members and a connector adapted to engage the second electrode and the joints between the members to complete a circuit between said electrodes through said members to weld the same together, said connector being adapted to be used as a lever with the second electrode as a fulcrum to exert pressure on the joints.

7. A machine for assembling metal articles, comprising means to position and support the members constituting the article in assembled relation, a relatively stationary electrode adapted to contact the members along the joints between the same, a second electrode along said joints and spaced away therefrom, and a connector adapted to engage the second electrode at any point along the same, said second electrode acting as a fulcrum whereby the connector may be used as a lever to exert pressure on the joints between the members to complete a circuit between said electrodes through said members at any point along the joint between the members to weld the same together.

8. A machine for assembling articles composed of a plurality of metal members, comprising an electrode adapted to receive and support the members in assembled relation, a second electrode adjacent the joints between the members but out of contact therewith, and a connector adapted to complete a circuit from one electrode through said members to the other at any point along the joints between the members to thereby weld the members together.

9. A machine for assembling vehicle fenders, comprising means for receiving and supporting the fender parts in assembled relation, a relatively stationary electrode adapted to contact said parts along the joints to be united, a second relatively stationary electrode adjacent the fender parts, and means for completing an electric circuit between said electrodes and through the joints between the fender parts to weld them together.

10. A machine for assembling vehicle fenders, comprising means for receiving and supporting the fender parts in assembled relation, a relatively stationary electrode adapted to contact one side of the joints between said parts, a second relatively stationary electrode along the opposite side of said joints and spaced away therefrom, and means for completing a circuit between said electrode and through said parts at any point along the joints between the same.

11. An assembling machine for vehicle fenders and the like comprising means for positioning and supporting the fender parts in proper relation to each other, conducting means connected to one side of an electric circuit and in contact with the joints between said parts, conducting means connected to the other side of the electric circuit located adjacent said first-named conducting means, and a plurality of independent connectors for completing the circuit between said conducting means through said fender parts to weld said parts together at a plurality of points at the same time.

12. An assembling machine for vehicle fenders and the like comprising a stationary electrode adapted to support the fender parts in assembled relation, said electrode having portions thereof adapted to engage the fender parts along the joints to be united, a second relatively stationary electrode along the joints between the fender parts but out of contact therewith and a connector for completing a circuit between said electrodes and through the fender parts to weld said parts together.

13. An assembling machine for vehicle fenders and the like, comprising a relatively stationary electrode for positioning and supporting the fender parts in assembled relation, said electrode having portions thereof adapted to engage the fender parts along the joints to be united, a second relatively stationary electrode along said joints but out of contact therewith and a connector adapted to be brought into engagement with the second electrode to complete a circuit therefrom through the fender parts to the first electrode to weld said parts together, said second electrode acting as a fulcrum whereby the connector may be used as a lever to exert pressure on the joints to be welded.

14. An assembling machine for vehicle fenders and the like, comprising a frame for receiving and supporting the fender parts in assembled position, conducting members of one polarity carried by said frame and adapted to contact the joints between the fender parts, a second set of conducting members of opposite polarity supported by said frame along said joints, said second set of conducting members being on the opposite side of said joints and spaced away therefrom, means for bridging the conducting members of opposite polarity at any point through the fender parts whereby an electric circuit may be completed through the fender parts to weld them together.

15. A machine for assembling vehicle fenders which have a crown and a skirt provided with inturned abutting flanges, comprising a frame for receiving the fender parts to position and support them in assembled position with the flanges in abutting relation, an electrode adapted to engage the skirt along the flange thereon, an electrode along the flange on the crown but spaced away therefrom, and means for completing an electric circuit between said electrodes and through said flanges at any point along the same.

16. A machine for assembling vehicle fenders which have a crown and a skirt provided with inturned abutting flanges, comprising a frame for receiving the fender parts to position and support them in assembled position with the flanges in abutting relation, an electrode adapted to engage the skirt along the flange thereon, an electrode along the flange on the crown but spaced away therefrom, and a plurality of independent connectors for completing electric circuit between said electrodes and through said flanges at a plurality of points at the same time.

17. A machine for assembling vehicle fenders which have a crown and a skirt provided with inturned abutting flanges, comprising a frame for receiving the parts for both right and left fenders and supporting them in assembled position with the flanges in abutting relation, relatively stationary electrodes adapted to engage the skirts along the flanges thereon, relatively stationary electrodes along the flanges on the crown but spaced away therefrom, and means for completing electric circuits between said electrodes and through said flanges at a plurality of points at the same time.

In witness whereof, I have hereunto subscribed my name in the presence of two witnesses.

JOSEPH LEDWINKA.

Witnesses:
  WM. J. MAGUIRE,
  EDW. R. HESS.